United States Patent [19]
Hennessey et al.

[11] 4,081,050
[45] Mar. 28, 1978

[54] FRONT ENGINE TRACTOR HAVING TRANSVERSE MIDSHIP MOUNTED HEAT EXCHANGER

[75] Inventors: Richard G. Hennessey, Oak Lawn; Richard A. Hale, Downers Grove; Anthony M. Kestian, Berwyn, all of Ill.

[73] Assignee: International Harvester Company, Chicago, Ill.

[21] Appl. No.: 765,162

[22] Filed: Feb. 2, 1977

[51] Int. Cl.² .......................... B60K 5/02; B60K 11/04
[52] U.S. Cl. ................................ 180/64 R; 180/54 A; 180/68 R; 280/5 A
[58] Field of Search ................. 180/68 R, 54 A, 54 D, 180/64 R, 69 R; 280/5 R, 5 A

[56] References Cited

U.S. PATENT DOCUMENTS

| | | | |
|---|---|---|---|
| 1,126,960 | 2/1915 | Day | 180/64 R |
| 1,333,418 | 3/1920 | Holmes | 180/64 R |
| 3,179,197 | 4/1965 | Peras | 180/54 A |
| 3,319,732 | 5/1967 | Soeteber et al. | 180/54 A |
| 3,727,712 | 4/1973 | Colloton | 180/68 R |
| 3,897,847 | 8/1975 | Knutson | 180/68 R |

*Primary Examiner*—David M. Mitchell
*Attorney, Agent, or Firm*—Douglas W. Rudy; Floyd B. Harman

[57] ABSTRACT

Engine location above or alternatively in front of the front axle of a two axle vehicle provides improved weight distribution in a tractor. Heat exchangers are located amidships with a fan drawing air through the heat exchangers and directing it around the engine. Heated air is directed away from the operator's compartment at the rear of the vehicle. Primary fuel tanks may also be mounted amidships and configured to provide arcuate planar surfaces for directing air borne noise and improving the flow of air to the heat exchangers.

12 Claims, 7 Drawing Figures

FRONT ENGINE TRACTOR HAVING TRANSVERSE MIDSHIP MOUNTED HEAT EXCHANGER

BACKGROUND OF THE INVENTION

1. Field of the Invention

This invention concerns improvements in tractor vehicles through the unique arrangement of drive line components resulting in significant handling and performance benefits. Specifically, a tractor vehicle is provided that has an engine mounted over, or alternatively in front of, the front axle of a two axle vehicle. An air circulating fan draws air from midship louvers through an upright transverse heat exchanger, located between the tractor firewall and the tractor engine, and past the vehicle engine to exit from the front grille area of the tractor.

A fuel tank may be mounted in front of the firewall and shaped to improve air flow to the heat exchanger. The fuel tank also serves as a noise barrier between the engine and the operator's compartment.

A drive shaft is interposed between the forward mounted engine and the transmission and differential located at the rear of the vehicle. The master clutch remains in the clutch housing portion of the transmission at the rear of the vehicle.

2. Description of the Prior Art

Contemporary non-articulated tractor vehicles owe their sophistication to a wide range of add on accessory equipment that transforms the decades old tractor design to the tractor farmers depend on today. The basic tractor concept is becoming unwieldy however, on cost, waste, and efficiency fronts when it burdened with a need to accommodate thousands of pounds of necessary accessories.

As expected the weight, balance and basic stability of contempory tractors has been affected through the addition of weight over the tractor's rear axle. Dual rear wheels, heavier axles, differentials, transmissions, brakes, larger fuel tanks, environmental cabs and heavier hitches have added to the weight at the rear of the tractor while only relatively minimal functional equipment weight has been added to the front of the tractor. This contradicts good weight distribution practices and precipitates the need for larger quantities of ballast overhanging the front of the tractor. Excess non-functional weight is expensive, inefficient, and cumbersome and it increases the overall non-functional length of the tractor.

As tractor horsepower increases both fuel consumption and noise generation increase, engine accessory noise emanates from immediately in front of the tractor operator and is blocked only by the firewall of the vehicle. Current tractors depend on heavily insulated cabs to combat this problem.

Fuel tank capacity on workable size non-articulated tractors is at its maximum now. Capacity increases are now only functions of intricate molded tanks that fit into broken up spaces and auxiliary tanks that interfere with tractor mobility. Tank size and location on some models also interfers with visibility to the hitch.

Other current tractor designs result in underhood conjestion due to space restrictions, inadequate cooling, and serviceability interferences.

Cooling air inlet openings tend to be smaller to complement increased flow velocities resulting in accelerated chaff plugging.

The invention disclosed herein presents a tractor vehicle that eliminates many of the prior and contemporary art deficiencies in tractors. This is done by judicious placement of the engine above or in front of the front axle and locating the heat exchanger and its fan between the engine and the tractor firewall. Displacement of the heat exchanger and the engine in this configuration leads to a multiplicity of improvements in tractors, overcoming the above deficiencies.

Several prior art tractor models include components of this invention however no assembly of components appears to have been made which is similar in all respects to the reverse flow tractor concept presented herein. A vehicle manufactured in the early 1920's by the assignee of this invention had a heat exchanger and the fan located between the engine and the operator's compartment although it did not have other characteristics important to this invention such as the engine location or the use and location of a fuel tank as an air directing member.

A perusal of farm tractor anthologies such as the 1932 *Cooperative Tractor Catalog* published by Implement and Tractor Trade Journal would indicate several vehicles where the engine is above or in front of the front axle. Also tractors have been known where the engine has been mounted "backwards" in relation to the radiator, however no tractor vehicles are known in the prior art that have all the advantages resulting from the unique combination and placement of components that are incorporated in the instant invention.

SUMMARY OF THE INVENTION

A tractor vehicle is provided having a longitudinal frame supported on a steerable front and non-steerable rear axle. An engine is mounted on resilient rubber mounts to the frame above the steerable front axle of the vehicle in two wheel rear drive configuration or above and in front of the steerable front axle in an alternative four wheel drive configuration.

The heat exchanger for cooling the circulating coolant of the engine is positioned between the front and rear axles and is provided with a fan, driven from an output shaft of the engine, that sucks air through the heat exchanger and blows it over the engine to facilitate cooling of the engine. Hot air passes through the engine compartment as defined by a conventional hood and side panels and exits through the front grille and the bottom of the engine compartment.

A fuel tank is located on the tractor frame in front of the operator's work station of the tractor which is generally situated somewhat in front of the rear axle of the tractor. The fuel tank is formed with flow improving inner surfaces that assist in directing air flow from intakes in the sides of the engine compartment enclosure to the heat exchanger. The fuel tank location, i.e. between the engine and the operator's work zone, also acts as a sound and noise control element.

An easily removable drive shaft connects the engine mechanical output to the tractor transmission which may be intergrally associated with the rear axle differential. In the four wheel drive configuration a second drive shaft transmits mechanical output from the rear axle housing to a front axle differential for eventual torque transmission to the driven front wheels.

Engine accessories are driven off both ends of the engine. The water pump and generator, for example, may be mounted at the front of the engine while the air conditioner compressor and the fan are driven off the rear of the engine. Actual component position is a design function and other locations and combinations are possible. The front engine accessories may be driven at speeds different than the rear engine accessory speeds. Thus the vehicle fan could be driven at a relatively slow speed to minimize noise generation.

It is among the objects of this invention to provide the advantages as obvious or expected from the identified viariations of the structure summarized above. These advantages include: improving tractor stability through improved weight distribution, improving cooling by increased air intake and exhaust area, providing a quieter tractor operator environment by locating the engine further away from the operator and imposing a radiator and gas tank as sound barriers, improving tractor serviceability by allowing easier access to engine compartments and master clutch and engine assembly removal without splitting the tractor.

Other desirable features of the reverse flow concept is the reduction of radiator plugging, minimizing crop foilage contact through midship air intake placing and the reduction in air conditioner heat load as hot air is directed away from the cab and inherent cooler fuel tank temperature as it is under the hood and constantly washed on several surfaces by ambient air. As only low velocity air is generated due to the large air exhaust areas there is less ground dust agitation by the exhaust air.

All the above advantages are provided in a tractor that, when compared to a similarly equipped conventional tractor has a shorter wheel base and an overall length similar to or shorter than conventional tractors.

These and other advantages of the reverse flow tractor configuration herein and set forth will be apparent from the following description of the invention and the appended claims.

DETAILED DESCRIPTION OF THE INVENTION

Figure 1:
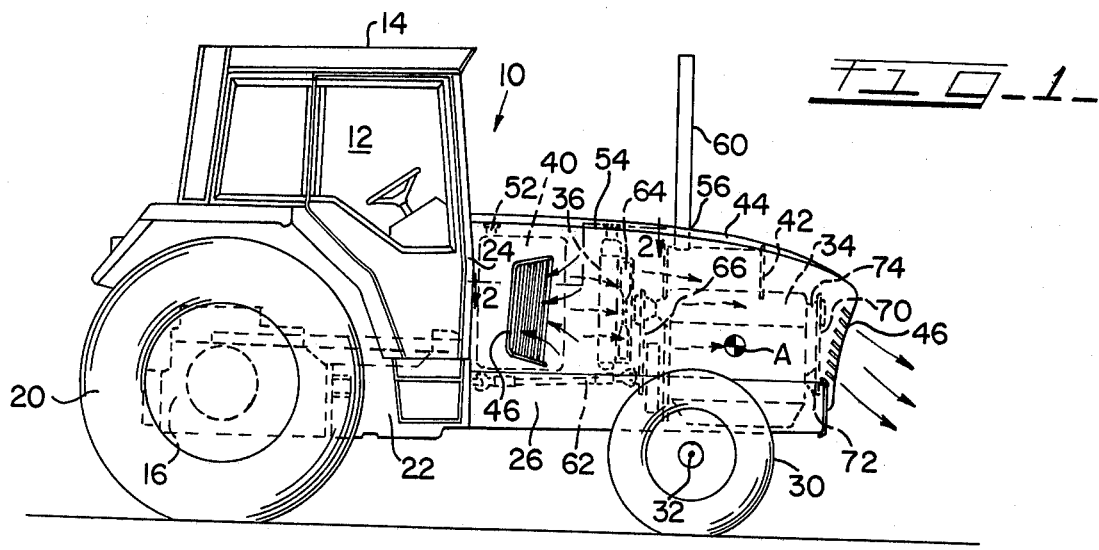
FIG. 1 is a side elevation view of a two wheel drive reverse flow tractor.

A two wheel drive embodiment of the reverse flow concept tractor is shown generally as 10 having an operators work zone 12 surrounded by a cab 14.

The rear portion of the tractor 10 is supported around the rear axle housing which accommodates rear wheels on the axle, one wheel shown as 20. The rear axle housing 16 may internally include hitch operating cylinders, vehicle brakes, a differential, auxiliary hydraulic pumps and various power takeoff apparatus among other devices none of which are shown but are included and well known in conventional tractors. A transmission 22 is integral with the rear axle as customary.

Figure 2:
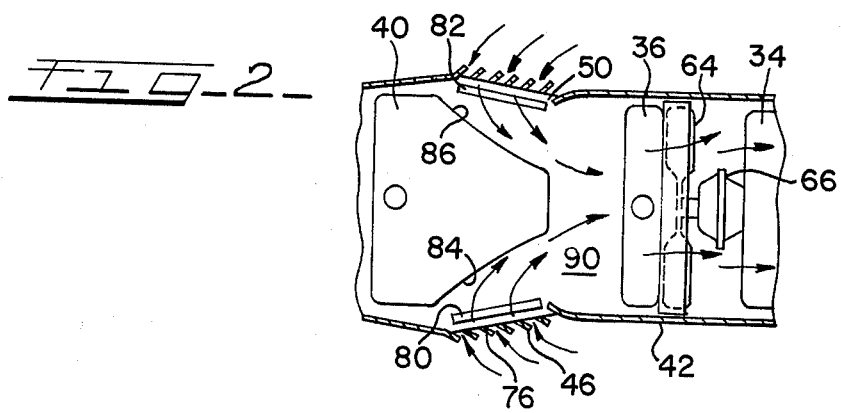
FIG. 2 is a plan view of the midship section of the tractor in FIG. 1.

The front portion of the vehicle, that portion in front of the firewall 24, is supported on a frame 26. Front wheels 30 are carried on a steerable axle 32 which is positioned by conventional suspension means (not shown) under the frame 26. The frame 26 provides a mounting location for the prime mover, its accessory and ancillary equipment. Specifically shown in FIGS. 1 and 2 are the vibration isolated engine 34, a radiator or heat exchanger 36, a fuel tank 40 as well as the engine compartment enclosure or front end body panels 42. The engine compartment enclosure 42 extends upwardly on each side of the engine compartment and includes a top or hood portion 44. The enclosure 44 surrounds the grill opening 46 and is further equipped with a pair of inlet openings 46 and 50, one on each side of the engine compartment as seen in 42. Access panels are provided in the hood 44 to allow filling of the fuel tank 40 through filler neck 52, and filling of the radiator 36 through filler neck 54. The hood 44 is perforated at 56 to accommodate an exhaust pipe 60.

Mechanical output of the engine 34 drives the transmission 22 through drive shaft 62. A fan 64 is also driven off the back end of the engine via rear fan belt 66. Other equipment such as the water pump 72 and the alternator 74 is driven off the front of the engine via front fan belt 70. Equipment such as an air conditioner compressor or small hydraulic pump may be driven either off the front or rear of the engine by either of the belts or directly off a moving component of the engine. With engine accessories driven off both ends of the engine 34 air flow blockage behind the fan is minimized and servicing is improved as compared with conventional layouts.

One of the unique aspects of this invention is the reverse flow of air from the midship section of a tractor passed the engine and out the front grille 46. The arrows in the figures indicate the flow of air as it is sucked into the engine enclosure 42 by the fan 64 and forced passed the engine. At the inlet openings 46 and 50 louvers 76 may be provided to selectively align the flow of air being sucked in. Interior of the inlet openings auxiliary heat exchangers, for instance oil cooler 80 and air conditioning condenser 82, may be mounted to advantageously harness the air flow for heat transfer. The heat exchanger 36 and fan 64 location allows a reduced front end length while also allowing the hood of the tractor to slope downward thus improving forward visability.

FIG. 2 presents a plan view of the fuel tank 40 where the contour wedge shaped air flow directing tank can be seen. The sides of the tank include arcuate panels 84 and 86 that direct air flow to the heat exchanger 36 with increased efficiency. In this zone of the tractor the engine enclosure is provided with a floor 90 however this floor does not seal the engine compartment immediately surrounding the engine. This allows the air flow on the engine side of the tractor to escape after washing over the engine either through the bottom of the engine compartment or through the louvered front grille 46. The louvers direct air flow forward and down toward the ground.

In FIG. 1 the engine location is important. The engine 34 is positioned such that its center of gravity indicated by symbol A is slightly ahead of the front axle. This engine location advantageously moves the noise source a considerable distance from the operator, improves front end stability and distributes the weight of the vehicle more evenly between the front 32 and rear axle housing 16. In order to reduce the transmission of engine vibrations to the supporting frame the engine is vibration isolated on elastic mounts.

Figure 3:
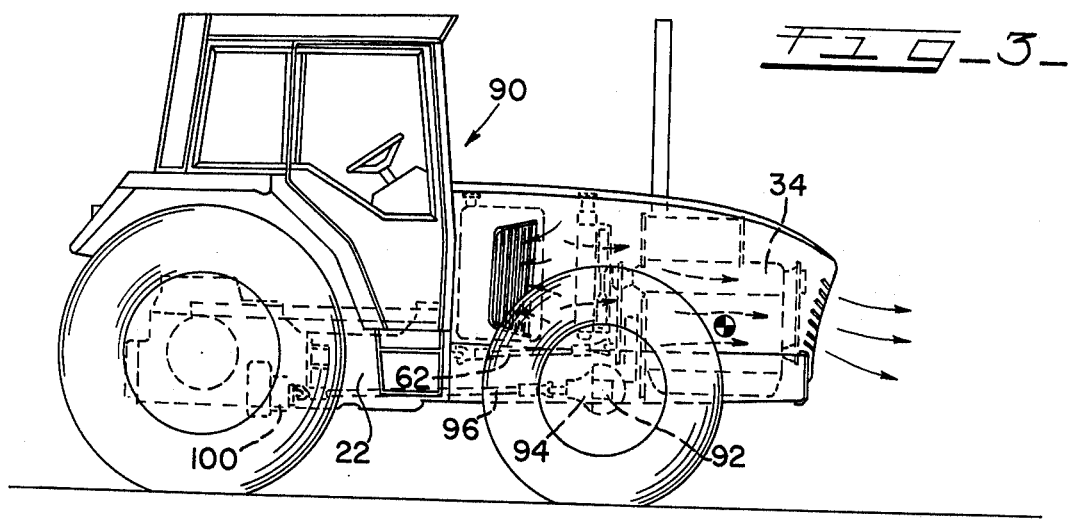
FIG. 3 is a side elevation view of a four wheel drive reverse flow tractor.

The tractor vehicle shown in FIG. 3 is a four wheel drive non-articulated reverse flow tractor generally 90 that includes the advantages set forth above relating to the two wheel drive tractor generally 10. Like parts of this Figure are assigned reference characters corresponding to identical parts illustrated in FIGS. 1 and 2.

The four wheel drive tractor 90 has a steerable front driven axle 92 located inboard of the back of the engine 34 so that the front differential 94 may be accommodated without changing the location or construction of the engine 34. Note that the drive shaft 62 is identical both in the length and angular displacement between the engine 34 and the transmission 22 on both vehicle embodiments. An auxiliary drive shaft 96 is used in the four wheel drive version to transmit the rotational mechanical output from the rear axle mounted transfer case 100.

Having the engine 34 cantilevered out in front of the driven axle 92 in this embodiment greatly improves the weight distribution and front end stability of this four wheel drive vehicle.

Figure 4:
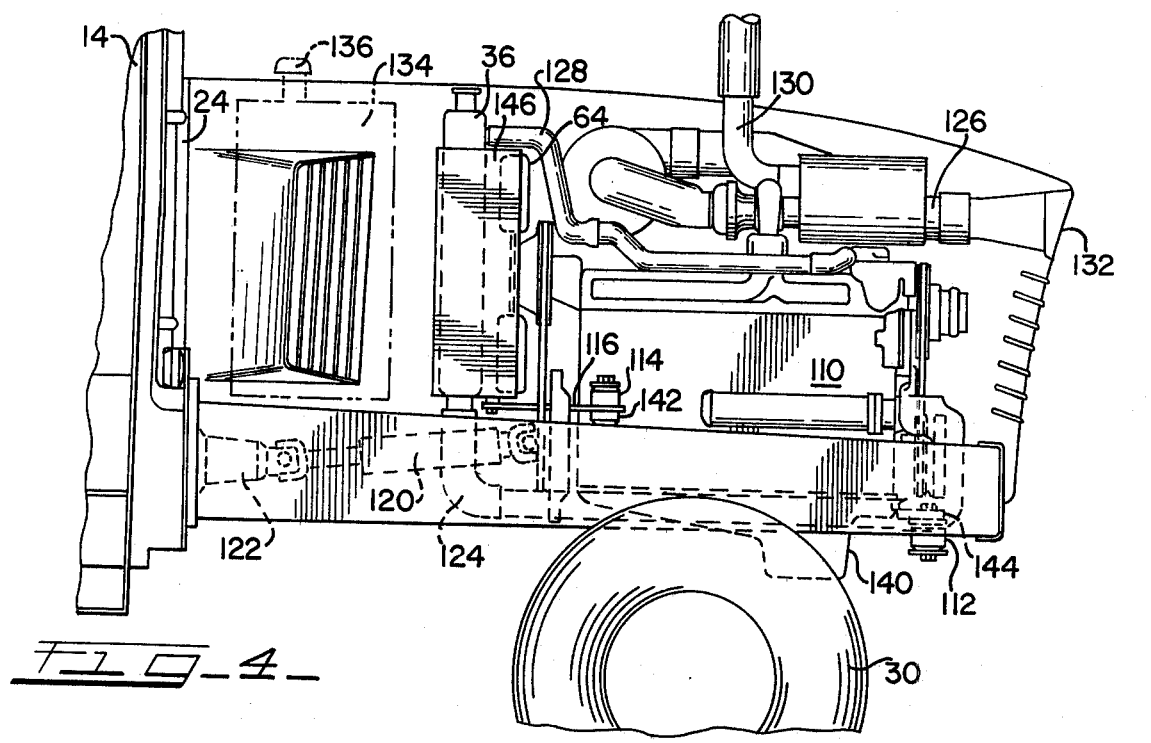
FIG. 4 is a front portion of a tractor vehicle showing same details of the invention.

FIG. 4 presents a somewhat more detailed view of the tractor vehicle shown in FIG. 1 with like components assigned like reference numerals. Wherein a second embodiment of a component is shown it is identified by a new reference numeral. The basic concept presented in both FIG. 1 and FIG. 4 is identical however.

Detail components include the firewall 24, the vibration isolated engine 110, having its front and rear isolation mounts 112 and 114 respectively, the radiator and fan shroud support 116, a varient of a quick disconnect drive shaft 120, an alternative transmission input housing 122. Note that the heat exchanger 36 is equipped with supply and return hoses 122 and 128 connected to the engine. The air intake system 126 as well as the exhaust system 130 is presented in more detail. An air intake 132 may be positioned at the front of the vehicle as an alternative location.

A slightly different fuel tank 134 having a filler cap 136 above the hood sheet is shown. An alternative oil pan 140 is also shown.

The engine 110 is mounted to the frame through vibration dampening mounts 112 and 114. The rear engine mount 114 supports the engine through a mounting tab 142 integral with the engine 110. A heat exchanger and fan shroud support 116 is also carried by this mount such that the heat exchanger 36 and fan shroud 146 may move with the engine rather than with the frame. An alternative embodiment however may find it more desirable to have the heat exchanger mounted either directly to, or through its own vibration dampening devices, the vehicle frame.

The front isolation mount 112 may be bolted through the frame while supporting the engine via front engine mounting tab 144.

A plurality of front and rear vibration dampening mounts may be used as necessary. Typically four mounts, two at the rear of the engine and two at the front of the engine, would be used although other placement schemes are contemplated.

Figures 5, 6:
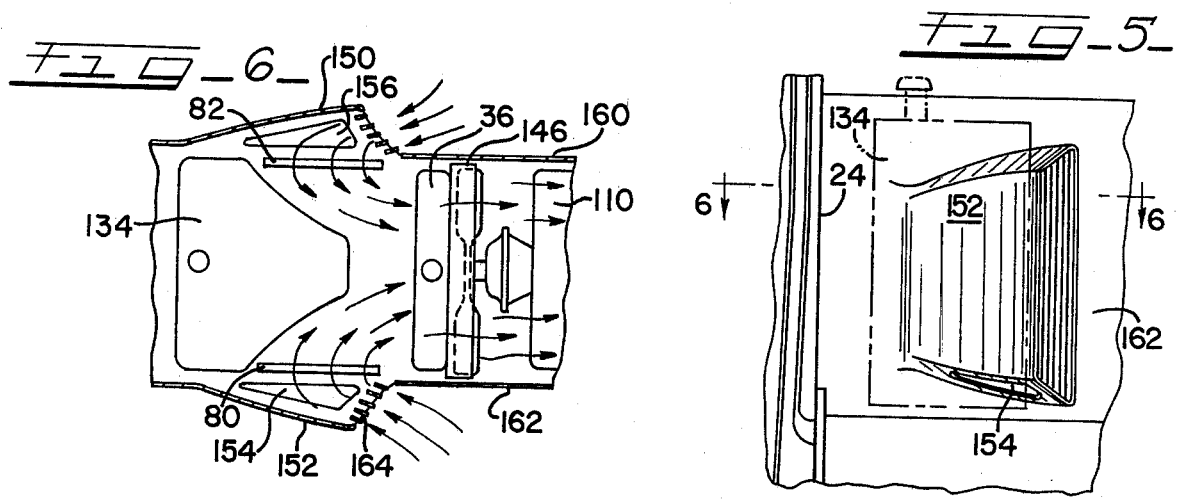
FIG. 5 presents an alternative air intake structure.
FIG. 6 is a plan view of a portion of the front of a tractor incorporating an alternative air intake structure.

FIG. 5 presents an alternative intake scoop 152 as part of an alternative body panel 162. This alternative scoop is located in the same relative proximity to the gas tank 134 as is the inlet opening 46 in FIG. 1. FIG. 5 clearly shows the chaff dropout opening 154 at the bottom of the scoop. This allows any accommulation of chaff that may entern the scoop to drop out.

The shape of this alternative air intake is best illustrated in FIG. 6. Previously discussed components include the fuel or gas tank 134, the engine coolant heat exchanger 36, the fan shroud 146 and the engine 110. Also familiar are the oil cooler 80 and the air conditioner condenser 82. Left and right intake scoops 150 and 152 include the chaff dropout openings 156 and 154. A representative louver structure is shown as 164.

Significant noise control barriers are most obvious in FIGS. 2 and 3. The sources of noise, the engine and the fan, are separated from the operator's compartment by the heat exchanger, the fuel tank and at least one firewall (FIG. 1). Futhermore, the air flow through this section of the vehicle is toward the front of the vehicle and away from the operator further affecting air borne noise. The zone between the heat exchanger and the fuel tank constitutes an accoustical chamber for noise admission control.

Figure 7:
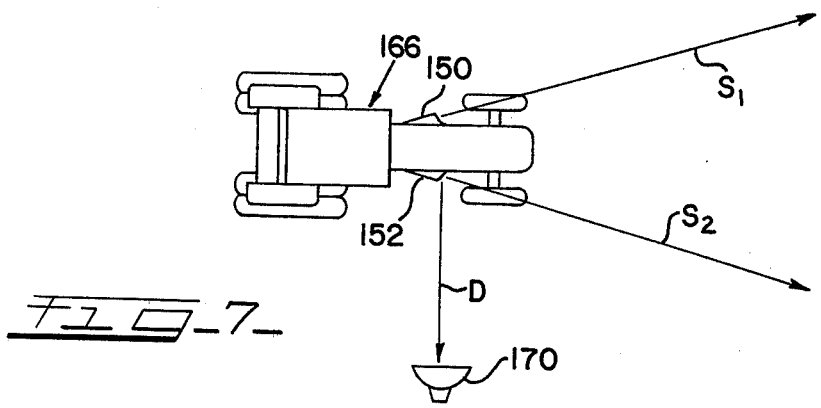
FIG. 7 is a symbolic representation of a tractor vehicle and noise paths emanating therefrom.

FIG. 7 is a pictorial representation of a tractor vehicle 166 incorporating the presented reverse flow concept being driven past a microphone 170. This "drive by" type of noise pollution measurement test ususally imposes a difficult standard where tractor performance is critical. (Decibel readings are taken at microphone 170 as the tractor passes by at a distance D. The vehicle of the instant invention shows excellent performance in this test due to the fact that the only line of sight noise path follows paths $S_1$ and $S_2$ (as well as straigth out the front of the tractor). The intake scoop shown in FIGS. 5 and 6 give excellent bypass noise relief measurements.

Alternative tractor configurations are of course contemplated. Among these would be an articulated tractor vehicle. Also tractor vehicles lacking the cab was shown in FIGS. 1 and 3 would benefit from the reverse air flow concept presented in this disclosure.

Thus there has been provided a tractor vehicle having numerous advantages including improved weight distribution and improved cooling characteristics that meets the advantages and objects set forth above. It will be understood that modifications and variations may be made without departing from the spirit and scope of the novel concepts that presented herein.

What is claimed is:

1. In a tractor vehicle having a steerable front axle supporting the vehicle frame, the improvement comprising:
    an engine mounted on the frame whereby the center of gravity of said engine is forward of said steerable front axle;
    a fuel tank carried midships of the vehicle;
    an engine coolant heat exchanger mounted in the vehicle between said engine and said fuel tank having fluid transfer means allowing fluid communication between said engine and said heat exchanger;
    an engine driven fan mounted between said engine and said engine coolant heat exchanger whereby a flow of air drawn by said engine driven fan from the fuel tank side of said heat exchanger passes through said engine coolant heat exchanger and past said engine.

2. The invention in accordance with claim 1 wherein the engine is mounted to said vehicle frame through the use of a plurality of front and rear vibration isolation mounts.

3. The invention in accordance with claim 2 whereby said engine is provided with a front mounted accessory drive means capable of driving ancillary equipment and said engine is further provided with a rear driving means including a drive shaft accommodating means and a rear mounted accessory drive means capable of driving ancillary equipment including said engine driven fan.

4. The invention in accordance with claim 1 wherein said fuel tank is a multisided tank having lateral arcuate surfaces curving inwardly and forwardly for directing air flow to said engine coolant heat exchanger from sources at right angles to the surface of said engine cooland heat exchanger.

5. The invention in accordance with claim 1 wherein said engine coolant heat exchanger is mounted directly to said vehicle engine via a plurality of heat exchanger and fan shroud supports whereby said heat exchanger moves with said engine.

6. In a tractor vehicle having a frame supported on a steerable front axle the improvement comprising:
- an engine mounted with its center of gravity forward of said steerable front axle to said vehicle frame through the use of a plurality of front and rear vibration dampening mounts;
- a front mounted accessory drive means capable of driving a multiplicity of ancillary equipment off the front end of said engine;
- a rear mounted drive means capable of driving a multiplicity of ancillary equipment off the back end of said engine including a drive shaft and a fan;
- a fuel tank having a plurality of air directing forward facing surfaces mounted above said tractor frame behind said steerable front axle;
- a heat exchanger mounted on heat exchanger and fan shroud supports to said vehicle engine ahead of said fuel tank;
- an engine driven fan mounted between said engine and said engine coolant heat exchanger whereby a flow of air is drawn through said heat exchanger when said fan is driven;
- a pair of air intake ducts located on a midship section of said vehicle adjacent said fuel tank whereby a quantity of air may be drawn by said fan into said engine coolant heat exchanger.

7. The invention in accordance with claim 6 wherein said air intake ducts are equipped with a chaff dropout opening in the lower portion of said intake duct and are further provided with a plurality of louvers bridging the opening of said air intake ducts.

8. The invention in accordance with claim 6 wherein auxially heat exchangers are mounted immediately inboard of said air intake ducts between said fuel tank and said engine coolant heat exchanger.

9. A two wheel drive tractor vehicle comprising:
- a chassis including a rear traction axle having rear wheel assemblies, said rear traction axle acting as a rear frame element, a front steerable axle having front wheel assemblies, and a frame supported by said front and rear wheel assemblies;
- an engine having a center of gravity supported by said frame on the vertical plane of the longitudinal center line of said tractor with said engine's center of gravity above and in front of said front steerable axle;
- an operator's work zone mounted on said rear traction axle including a firewall at the front of the work zone;
- a heat exchanger mounted on said frame between said engine and said firewall;
- a fan mounted between said heat exchanger and said engine and driven by said engine inducing air flow through the heat exchanger and over the engine;
- a fuel tank mounted midship on the tractor between said firewall and said heat exchanger.

10. A tractor vehicle comprising:
- a frame structure defining a longitudinal axis and comprising first and second spaced longitudinal frame members extending along opposite sides of said longitudinal axis;
- four wheel assemblies upon which said frame is suspended comprising a pair of front steerable wheel assemblies and a pair of rear wheel assemblies;
- an engine supported by said frame having its center of gravity forward of a transversely extending axis of the front steerable wheel assemblies;
- a fuel tank supported by said frame midship of said tractor vehicle;
- a heat exchanger supported by said frame between said fuel tank and said engine;
- a fan mounted between said heat exchanger and said engine, driven by said engine inducing air flow through said heat exchanger towards said engine.

11. The invention in accordance with claim 10 wherein the tractor vehicle is a two wheel drive tractor where the rear wheel assemblies are used to drive the vehicle and the front steerable wheel assemblies allow steering and support for the tractor vehicle.

12. The invention in accordance with claim 10 wherein the tractor vehicle is a four wheel drive vehicle where both the front and rear wheel assemblies are used to drive the vehicle.

* * * * *